US 6,542,556 B1

(12) United States Patent
Kuchi et al.

(10) Patent No.: US 6,542,556 B1
(45) Date of Patent: Apr. 1, 2003

(54) SPACE-TIME CODE FOR MULTIPLE ANTENNA TRANSMISSION

(75) Inventors: Kiran Kuchi, Irving, TX (US); Jyri K. Hämäläinen, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/539,819

(22) Filed: Mar. 31, 2000

(51) Int. Cl.[7] .............................. H04B 7/06; H04J 11/00
(52) U.S. Cl. ...................... 375/299; 375/146; 370/204; 370/209
(58) Field of Search .................................. 375/133, 135, 375/136, 141, 146, 147, 260, 267, 299; 370/204, 208, 209, 210; 455/101, 103

(56) References Cited

U.S. PATENT DOCUMENTS

| | | | | |
|---|---|---|---|---|
| 5,170,413 A | * | 12/1992 | Hess et al. ................. | 375/260 |
| 5,859,870 A | * | 1/1999 | Tsujimoto .................. | 375/143 |
| 5,933,421 A | * | 8/1999 | Alamouti et al. ........... | 370/330 |
| 5,943,372 A | | 8/1999 | Gans et al. | |
| 6,031,474 A | * | 2/2000 | Kay et al. .................. | 341/106 |
| 6,088,408 A | * | 7/2000 | Calderbank et al. ........ | 374/347 |
| 6,097,771 A | | 8/2000 | Foschini | |
| 6,115,427 A | * | 9/2000 | Calderbank et al. ........ | 375/267 |
| 6,178,196 B1 | * | 1/2001 | Naguib et al. .............. | 375/148 |
| 6,317,411 B1 | * | 11/2001 | Whinnett et al. ........... | 370/204 |
| 6,317,466 B1 | | 11/2001 | Foschini et al. | |

FOREIGN PATENT DOCUMENTS

| | | |
|---|---|---|
| GB | 2 237 706 A | 5/1991 |
| WO | WO 97/41670 | 11/1997 |
| WO | WO 99/14871 | 3/1999 |
| WO | WO 99/23766 | * 5/1999 |
| WO | WO 00/11806 | 3/2000 |
| WO | WO 00/18056 | 3/2000 |
| WO | WO 00/49780 | 8/2000 |
| WO | WO 00/51265 | 8/2000 |
| WO | WO 01/19013 A1 | 3/2001 |
| WO | WO 01/54305 A1 | 7/2001 |
| WO | WO 01/56218 A1 | 8/2001 |
| WO | WO 01/63826 A1 | 8/2001 |
| WO | WO 01/69814 A1 | 9/2001 |

OTHER PUBLICATIONS

Guey Jiann–Ching: "Concatenated coding for transmit diversity systems" Proceedings of the 1999 VTC—Fall IEEE VTS 50th Vehicular Technology Conference 'Gateway to 21st Century Communications Village'; Amsterdam, Neth. Sep. 19–Sep. 22, 1999, vol. 5, 1999 pp. 2500–2504, XP002181329 IEEE Veh. Technol. Conf. , IEEE Vehicular Technology Conference 1999 IEEE, Piscataway, NJ, USA—whole document.

Alamouti S M: "A Simple Transmit Diversity Technique for Wireless Communications", IEEE Journal on Selected Areas in Communications, IEEE Inc. New York, US, vol. 16, No. 8, Oct. 1998, pp. 1451–1458, XP002100058, ISSN: 0733–8716, cited in the applicaion the whole document.

(List continued on next page.)

Primary Examiner—Young T. Tse
(74) Attorney, Agent, or Firm—Brian T. Rivers

(57) ABSTRACT

A method and apparatus for space-time coding signals for transmission on multiple antennas. A received input symbol stream is transformed using a predefined transform and transmitted on a first set of N antennas. The same input symbol stream is then offset by M symbol periods to generate an offset input symbol stream. The offset input symbol stream is then transformed using the predefined transform and transmitted on a second set of N antennas. A third through $X^{th}$ set of N antennas may be utilized for transmission by successively offsetting the offset input symbol stream by an additional M symbol periods for each additional set of N antennas used, before performing the transform and transmitting on the additional set of N antennas.

24 Claims, 2 Drawing Sheets

OTHER PUBLICATIONS

Tarokh V et al: "Space–Time Block Coding for Wireless Communications: Performance Results", IEEE Journal on Selected Areas in Communications, IEEE Inc. New York, US, vol. 17, No. 3, Mar. 1999, pp. 451–460, XP000804974 ISSN: 0733–8716 equations (6) and (7).

A. Hiroike, F. Adachi, N. Nakajima "Combined Effects of Phase Sweeping Transmitter Diversity and Channel Coding", IEEE Transactions on Vehicular Technology, vol. 41, No. 2, May 1992.

L. Jalloul, K. Rohani, K. Kuchi, J. Chien "Performance Analysis of CDMA Transmit Diversity Methods" IEEE Vehicular Technology Conference, Fall 1999; pp. 1326–1330.

Alberto Gutierrez et al., "An Introduction to PSTD for IS–95 and CDMA 2000", Wireless Communications and Networking Conference, WCNC, pp. 1358–1362, vol. 3, 1999.

Two Signaling Schemes for Improving the Error Performance of Frequency–Division–Duplex (FDD) Transmission Systems Using Transmitter Antenna Diversity, Seshadri, et al. 1993 IEEE; pp. 508–511.

A Simple Transmit Diversity Technique for Wireless Communications, S. M. Alamouti, 1998 IEEE; pp. 1451–1458.

Space–Time Block Codes from Orthogonal Designs, Tarokh, et al., 1999 IEEE; pp. 1456–1467.

Downlink Improvement through Space–Time Spreading, Kogiantis, et al., Proposal for 3PP2/TSG–C3–19990805–xx.

Link Performance Comparison of OTD and STTD/STS for Voice Applications, Kuchi, et al., Proposal for 3GPP2–C30–19990826–_.

Open and Closed Loop Transmit Diversity at High Data Rates on 2 and 4 Elements, Harrison, et al., Proposal for 3GPP2–C30–19990817–017, 1999.

Seshadri, N. et al; Space–Time Codes for Wireless Communication: Code Construction: 1997 IEEE; pp. 637–641; 0–7803–3659–3/97.

Tarokh, V., et al.; The Application of Orthogonal Designs to Wireless Communication; 1998 IEEE; pp. 46–47; 0–7803–4408–1/98.

Tarokh, V. et al; Space–Time Codes for High Data Rate Wireless Communication: Performance Criteria; 1999 IEEE; pp. 299–303.

Tarokh, V. et al; A Differential Detection Scheme for Transmit Diversity; 1999 IEEE; pp. 1043–1047; 0–7803–5668–3/99.

Foschini, G.; Layered Space–Time Architecture for Wireless Communication in a Fading Environment When Using Multi–Element Antennas; Bell Labs Technical Journal, 1996; p. 41–p.59.

Tirkkonen, O. et al.; Complex Space–Time Block Codes for Four Tx Antennas; IEEE; 2000; p. 1005–p. 1009; 0–7803–6451–1/10.

Hottinen, A. et al.; Closed–loop transmit diversity techniques for multi–element transceivers; IEEE 2000; p. 70–73; 0–7803–6507–0/00.

Tirkkonen, O. et al.; Minimal Non–Orthogonality Rate 1 Space–Time Block Code for 3+ Tx Antennas; IEEE Sep. 6–8, 2000; 6th Int. Symp. on Spread–Spectrum Tech. & Appli., NJIT, New Jersey, USA; p. 429–p. 432.

Sweatman, C. et al.; A Comparison of Detection Algorithms including BLAST for Wireless Communication using Multiple Antennas; IEEE 2000; p. 698–p. 703; 0–7803–6465–5/00.

Damen, O. et al.; Lattice Code Decoder for Space–Time Codes; IEEE 2000; p. 161–p. 163; 1089–7798/00; IEEE Communications Letters, vol. 4, No. 5, May 2000.

Calderbank, A. et al.; Space–Time Codes for Wireless Communication; 19997 IEEE; ISIT 1997, Ulm, Germany, Jun. 29–Jul. 4; p. 146.

Tarokh, V. et al.; Recent Progress in Space–Time Block and Trellis Coding; 1998 IEEE; ISIT 1998, Cambridge, MA, USA; Aug. 16–Aug. 21; p. 314.

Rohani, K. et al.; A Comparison of Base Station Transmit Diversity Methods for Third Generation Cellular Standards; 1999 IEEE; 0–7803–5565–2/99; p. 351–p. 355.

Jalloul, L. et al.; Performance Analysis of CDMA Transmit Diversity Methods; 1999 IEEE; 0–7802–5435–4/99; p. 1326–p. 1330.

Raitola, M. et al.; Transmission Diversity in Wideband CDMA; 1999 IEEE; 0–7803–5565–2/99; p. 1545–1549.

Correia, A. et al.; Optimised Constellations for Transmitter Diversity; 1999 IEEE; 0/7803–5435–4/99; p. 1785–1789.

Tarokh, V. et al.; A Differential Detection Scheme for Transmit Diversity; 1999 IEEE; 0–7803–5668–3/99; p. 1043–p. 1047.

D. Mihai Ionescu; New Results on Space–Time Code Design Criteria; 1999 IEEE; pp. 684–687; 0–7803–5668–3/99.

Tarokh, V., et al.; Space–Time Codes for High Data Rate Wireless Communication: Performance Criterion and Code Construction; 1998 IEEE; IEEE Transactions on Information Theory, vol. 44, No. 2, Mar. 1998.

Edited by Holma H., et al.; WCDMA for UMTS Radio Access for Third Generation Mobile Communications; Reprinted Jun. 2000; p. 97; John Wiley & Sons, Ltd., Baffins Lane, Chichester, West Sussex, PO19 1UD, England.

Tarokh, V., et al.; Space–Time Block Coding for Wireless Communications: Performance Results; 1999 IEEE; IEEE Journal on Selected Areas in Communications, vol. 17. No. 3, Mar. 1999.

Naguib, A.F. et al; Space–Time Coded Modulation for High Data Rate Wireless Communications; 1997 IEEE; pp. 102–109; 0–7803–4198–8/97.

Shiu, D. et al.; "Scalable Layered Space–Time Codes for Wireless Communications: Performance Analysis and Design Criteria"; 0–7803–5668–3/99; 159–163 pp.; 1999 IEEE; University of California at Berkeley USA.

Alamouti, S.M. et al; Trellis–Coded Modulation and Transmit Diversity: Design Criteria and Performance Evaluation; 1998 IEEE; pp. 703–707; 0–7803–5106–1/98.

Shiu, D. et al.; "Layered Space–Time Codes for Wireless Communications Using Multiple Transmit Antennas"; 0–7803–5284–X99; 436–440 pp.; 1999 IEEE; University of California at Berkeley USA.

Hassibi, B. et al.; "High–Rate Linear Space–Time Codes"; IEEE Apr. 2001; p. 2461–p. 2464, 0–7803–7041–04/01.

Lo, T. et al; Space–Time Block Coding—From a Physical Perspective; 1999 IEEE; pp. 150–153; 0–7803–5668–3/99.

* cited by examiner

SPACE-TIME CODE FOR MULTIPLE ANTENNA TRANSMISSION

FIELD OF THE INVENTION

This invention relates to a method and apparatus for achieving transmit diversity in telecommunication systems and, more particularly, to a method and apparatus for space-time coding signals for transmission on multiple antennas.

BACKGROUND OF THE INVENTION

As wireless communication systems evolve, wireless system design has become increasingly demanding in relation to equipment and performance requirements. Future wireless systems, which will be third and fourth generation systems compared to the first generation analog and second generation digital systems currently in use, will be required to provide high quality high transmission rate data services in addition to high quality voice services. Concurrent with the system service performance requirements will be equipment design constraints, which will strongly impact the design of mobile terminals. The third and fourth generation wireless mobile terminals will be required to be smaller, lighter, more power-efficient units that are also capable of providing the sophisticated voice and data services required of these future wireless systems.

Time-varying multi-path fading is an effect in wireless systems whereby a transmitted signal propagates along multiple paths to a receiver causing fading of the received signal due to the constructive and destructive summing of the signals at the receiver. Several methods are known for overcoming the effects of multi-path fading, such as time interleaving with error correction coding, implementing frequency diversity by utilizing spread spectrum techniques, or transmitter power control techniques. Each of these techniques, however, has drawbacks in regard to use for third and fourth generation wireless systems. Time interleaving may introduce unnecessary delay, spread spectrum techniques may require large bandwidth allocation to overcome a large coherence bandwidth, and power control techniques may require higher transmitter power than is desirable for sophisticated receiver-to-transmitter feedback techniques that increase mobile terminal complexity. All of these drawbacks have negative impact on achieving the desired characteristics for third and fourth generation mobile terminals.

Antenna diversity is another technique for overcoming the effects of multi-path fading in wireless systems. In diversity reception, two or more physically separated antennas are used to receive a signal, which is then processed through combining and switching to generate a received signal. A drawback of diversity reception is that the physical separation required between antennas may make diversity reception impractical for use on the forward link in the new wireless systems where small mobile terminal size is desired. A second technique for implementing antenna diversity is transmit diversity. In transmit diversity a signal is transmitted from two or more antennas and then processed at the receiver by using maximum likelihood sequence estimator (MLSE) or minimum mean square error (MMSE) techniques. Transmit diversity has more practical application to the forward link in wireless systems in that it is easier to implement multiple antennas in the base station than in the mobile terminal.

Transmit diversity for the case of two antennas is well studied. Alamouti has proposed a method of transmit diversity for two antennas that offers second order diversity for complex valued signals. S. Alamouti, "A Simple Transmit Diversity Technique for Wireless Communications," IEEE Journal on Selected Areas of Communications, pp. 1451–1458, October 1998. The Alamouti method involves simultaneously transmitting two signals from two antennas during a symbol period. During one symbol period, the signal transmitted from a first antenna is denoted by $s_0$ and the signal transmitted from the second antenna is denoted by $S_1$. During the next symbol period, the signal $-s_1^*$ is transmitted from the first antenna and the signal $s_0^*$ is transmitted from the second antenna, where * is the complex conjugate operator. The Alamouti method may also be done in space and frequency coding. Instead of two adjacent symbol periods, two orthogonal Walsh codes may be used to realize space-frequency coding.

Extension of the Alamouti method to more than two antennas is not straightforward. Tarokh et al. have proposed a method using rate=½, and ¾ SpaceTime Block codes for transmitting on three and four antennas using complex signal constellations. V. Tarokh, H. Jafarkhani, and A. Calderbank, "Space-Time Block Codes from Orthogonal Designs," IEEE Transactions on Information Theory, pp. 1456–1467, July 1999. This method has a disadvantage in a loss in transmission rate and the fact that the multi-level nature of the ST coded symbols increases the peak-to-average ratio requirement of the transmitted signal and imposes stringent requirements on the linear power amplifier design. Other methods proposed include a rate=1, orthogonal transmit diversity (OTD)+space-time transmit diversity scheme (STTD) four antenna method. L. Jalloul, K. Rohani, K. Kuchi, and J. Chen, "Performance Analysis of CDMA Transmit Diversity Methods," Proceedings of IEEE Vehicular Technology Conference, Fall 1999, and M. Harrison, K. Kuchi, "Open and Closed Loop Transmit Diversity at High Data Rates on 2 and 4 Elements," Motorola Contribution to 3GPP-C30-19990817-017. This method requires an outer code and offers second order diversity due to the STTD block (Alamouti block) and a second order interleaving gain from use of the OTD block. The performance of this method depends on the strength of the outer code. Since this method requires an outer code, it is not applicable to uncoded systems. For the case of rate=⅓ convolutional code, the performance of the OTD+STTD method and the Tarokh rate=¾ method ST block code methods are about the same.

SUMMARY OF THE INVENTION

The present invention presents a method and apparatus for space-time coding signals for transmission on multiple antennas. In the method and apparatus, a received input symbol stream is transformed using a predefined transform and transmitted on a first set of N antennas. The same input symbol stream is then offset in time by M symbol periods to generate an offset input symbol stream. The offset input symbol stream may be offset so as to lead or lag the input symbol stream. The offset input symbol stream is then transformed using the predefined transform and transmitted on a second set of N antennas. A third through $X^{th}$ set of N antennas may be utilized for transmission by successively offsetting the offset input symbol stream by an additional M symbol periods for each additional set of N antennas used, before performing the transform and transmitting on the additional set of N antennas. The transform may be applied in either the time domain or Walsh code domain.

At the receiver, the transmitted symbols may be recovered using a maximum likelihood sequence estimator (MLSE) decoder implemented with the Viterbi algorithm with a decoding trellis according to the transmitter.

In an embodiment, 4 antennas are used for transmission. Every 2 input symbols in a received input symbol stream are transformed in the time domain by an Alamouti transform and the result is transmitted on antennas 1 and 2 during the time of two symbol periods. The received input symbol stream is also delayed for two symbol periods, and this delayed input symbol stream is input to an Alamouti transform where every two symbols are transformed and the delayed result is transmitted on antennas 3 and 4 during the time of two symbol periods. The transmitted signal may be received and decoded using an MLSE receiver. The method and apparatus provides diversity of order four and outperforms other proposed extensions of the Alamouti method to more than two antennas by approximately ½ to 1 dB for uncoded transmissions.

In an alternative embodiment using 4 antennas, every 2 input symbols in a received input symbol stream are transformed in the Walsh code domain. The Alamouti coded symbols are transmitted on two orthogonal Walsh codes, W1 and W2 simultaneously on antennas 1 and 2. Both W1 and W2 span two symbol periods, which maintains the transmission rate at two symbol periods. The received input symbol stream is also delayed for two symbol periods and the Alamouti transform is also applied in the Walsh code domain to the delayed input symbol stream. This delayed result is transmitted on antennas 3 and 4 during the time of two symbol periods.

In a further alternative embodiment using 8 antennas for transmission, a rate=¾ ST block code is combined with a 4 symbol delay. Every three symbols in an input symbol stream are transformed by the ST block code and transmitted on antennas 1–4. The received input symbol stream is also delayed for four symbol periods, and this delayed input symbol stream is input to the ST block code transform where every three symbols are transformed and the delayed result is transmitted on antennas 4–8 during the time of four symbol periods.

DETAILED DESCRIPTION OF THE INVENTION

Figure 1:
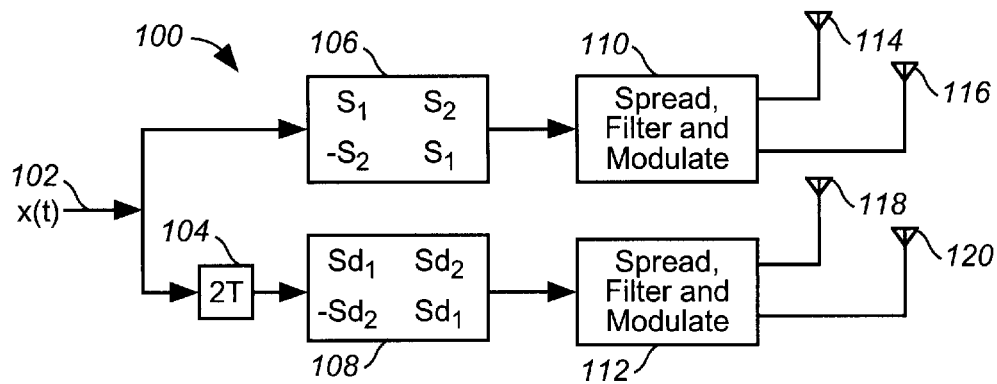
FIG. 1 shows a block diagram of portions of a transmitter according to an embodiment of the invention.

Referring now to FIG. 1, therein is illustrated a block diagram of portions of a transmitter 100 according to an embodiment of the invention. Transmitter 100 includes input 102, offset block 104, transform block 106, transform block 108, spread, filter and modulate (SFM) block 110, spread, filter and modulate (SFM) block 112, antenna 114, antenna 116, antenna 118 and antenna 120. Transmitter 100 may be implemented into any type of transmission system that transmits coded or uncoded digital transmissions over a radio interface.

In the embodiment of FIG. 1, transmitter 100 receives an input symbol stream X(t) at input 102. X(t) is split into two identical symbol streams, with one symbol stream X(t) being input to transform block 106 and a second identical symbol stream X(t) being input to offset block 104. Offset block 104 causes a 2 symbol period delay in the second symbol stream and then the delayed second symbol stream is input to transform block 108. Every two symbols S1 and S2 are processed in transform block 106 using the Alamouti method and the output of the transform is transmitted on antenna 114 and antenna 116. The input signal may be complex valued and of arbitrary constellation size. The Alamouti transformation performed in transform block 106 can be written in a matrix form as shown below:

$$\begin{bmatrix} S_1 & S_2 \\ -S_2^* & S_1^* \end{bmatrix} \qquad \text{Equation 1}$$

The rows in the matrix indicate the antenna the symbol is transmitted on, and the columns indicate the instant they are transmitted. Symbols S1 and S2 are transmitted on antenna 114 and antenna 116 at instants t1 and t2, respectively.

The second identical symbol stream X(t) input to offset block 104 is offset by two symbol periods and transformed in transform block 108 using the Alamouti transformation as shown below:

$$\begin{bmatrix} Sd_1 & Sd_2 \\ -Sd_2^* & Sd_1^* \end{bmatrix} \qquad \text{Equation 2}$$

The output of the transform from transform block 108 is then transmitted on antenna 118 and antenna 120. The transmitted signal as it will be received during the time period $(0,t1)$ can be written as follows:

$$r(t1) = \sqrt{\frac{E_c}{4}} [S_1\alpha 1 - S_2^*\alpha 2 + S_{d1}\alpha 3 - S_{d2}^*\alpha 4] + n(t1) \qquad \text{Equation 3}$$

and, for the time duration $(t1,t2)$ as, $$r(t2) = \sqrt{\frac{E_c}{4}} [S_2\alpha 1 + S_1^*\alpha 2 + S_{d2}\alpha 3 + S_{d1}^*\alpha 4] + n(t2) \qquad \text{Equation 4}$$

where $S_{d1}$ and $S_{d2}$ are the transmitted symbols on the delayed branch and n(t) is the additive white Gaussian noise.

The transmitted signal power $E_c$ may be evenly distributed across the four antennas and the channel coefficients $\alpha$ may be modelled as complex Gaussian.

Figure 2:
FIG. 2 shows a block diagram of portions of a receiver according to an embodiment of the invention.

This received signal can be decoded using an MLSE receiver. Referring now to FIG. 2, therein is shown a receiver 200 according to an embodiment of the invention. Receiver 200 includes antenna 202, filter, despread and demodulate block 204, processor block 206, and output 208.

In the embodiment, receiver 200 receives the transmitted signal r(t) at antenna 202, and filters, despreads and demodulates the signal in filter, despread and demodulate block 204. Processor block 206 then decodes the sequence that minimizes the Eucledian distance D between the transmitted and received signals and outputs the sequence at output 208 according to the following:

$$\begin{aligned} D &= \|r(t) - (x(t) + x(t - 2T))\| \\ &= \|r(t1) - (S_1\alpha 1 - S_2^*\alpha 2 + S_{d1}\alpha 3 - S_{d2}^*\alpha 4)\| + \end{aligned} \qquad \text{Equation 5}$$

-continued $$\|r(t2) - (S_2\alpha 1 + S_1^*\alpha 2 + S_{d2}\alpha 3 + S_{d1}^*\alpha 4)\|$$

Further optimization of the branch metrics can be obtained with the following simplification. Using the equations, $$\tilde{r}(t1) = r(t1) - (S_1\alpha 1 - S_2^*\alpha 2) \qquad \text{Equation 6}$$

$$\tilde{r}(t2) = r(t2) - (S_2\alpha 1 + S_1^*\alpha 2) \qquad \text{Equation 7}$$

the following metric can be obtained:

$$D^2 = \|\tilde{r}(t1) - (S_{d1}\alpha 3 - S_{d2}^*\alpha 4)\|^2 + \|\tilde{r}(t2) - (S_{d2}\alpha 3 + S_{d1}^*\alpha 4)\|^2 \qquad \text{Equation 8}$$

This may be further simplified as:

$$D^2 = \|\tilde{r}(t1)(\alpha 3)^* + \tilde{r}(t2)^*\alpha 4 - S_{d1}\|^2 + \qquad \text{Equation 9}$$
$$\|\tilde{r}(t1)(\alpha 4)^* - \tilde{r}(t2)^*\alpha 3 + S_{d2}^*\|^2$$

Symbols $S_{d1}$, $S_{d2}$ may be found separately. In the simplification given by equation 9, only the values $S_{d1}$ and $S_{d2}$ need to be modified at each computation stage. This reduces the number of multiplications in the calculation.

The input to the Viterbi decoder is the sampled received signal observed over "n" time epochs or n symbol periods, where n=2 for 4 antenna ST codes. The state transitions in the Viterbi decoder occur every "n" time epochs.

Figure 3:
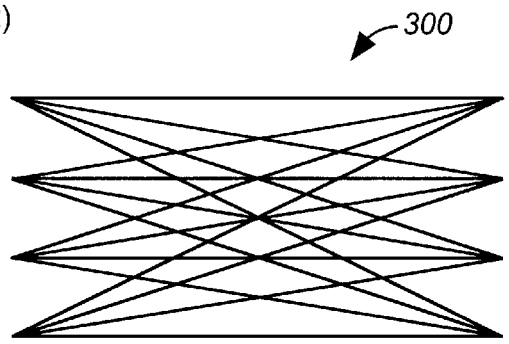
FIG. 3 shows a trellis structure used to process signals in the receiver of FIG. 2.

Referring now to FIG. 3, therein is shown a trellis structure 300 used to process the ST code of the received signal in receiver 200, according to an embodiment of the invention. Trellis structure 300 is the binary phase shift keying (BPSK) trellis diagram for a 4 antenna space-time (ST) code. Trellis 300 can be described using the following state labelling:

Next state=input symbols $(S_1, S_2)$    Equation 10

Output={previous state, input symbols}={$(S_{d1}, S_{d2})$, ($S_1, S_2$)}    Equation 11

The number of states in the trellis 300 is given by $M^2$ where M is the signal constellation size. The total number of states shown in trellis 300 is 4. Trellis 300 may be decoded using the Viterbi algorithm. FIG. 3 shows the bpsk case. Other modulation may be used in alternative embodiments. Generally, for the case of a 4-antenna ST code, the decoder has to remember all possible 2 previous symbols (i.e., 4 states for bpsk, and 16 states for qpsk, 64 states for 8-psk and so on) at each state.

Figure 4:
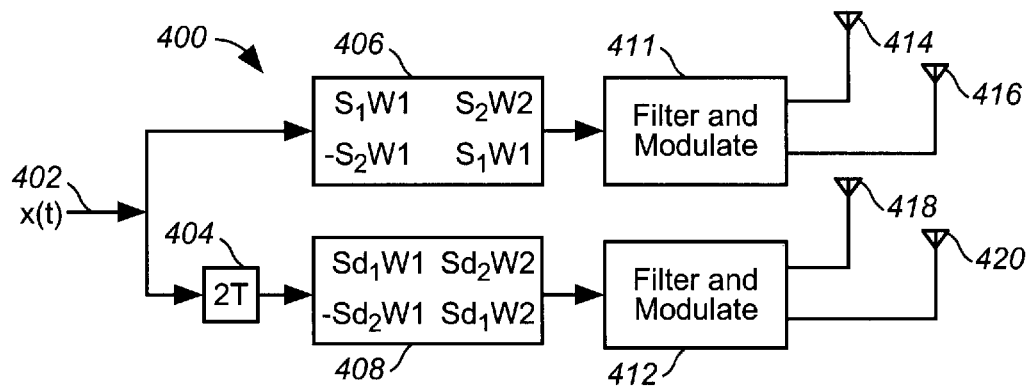
FIG. 4 shows a block diagram of portions of a transmitter according to an alternative embodiment of the invention.

Referring now to FIG. 4, therein are shown portions of a transmitter according to an alternative embodiment of the invention. FIG. 4. shows transmitter 400, which includes input 402, offset block 404, space-time spreading (STS) transform block 406, STS transform block 408, filter and modulate block 410, filter and modulate block 412 and antennas 414, 416, 418 and 420. In transmitter 400, the Alamouti transformation is applied in Walsh code domain instead of time domain. The Alamouti coded symbols are transmitted on two orthogonal Walsh codes W1, W2 simultaneously. Both W1 and W2 span two symbol periods in this case maintaining the total transmission rate. This method is known as space-time spreading (STS). A delayed copy of the input signal is STS transformed again and transmitted via the other two antennas.

In the embodiment of FIG. 4, transmitter 400 receives an input symbol stream X(t) at input 402. X(t) is split into two identical symbol streams, with one symbol stream X(t) being input to transform block 406 and a second identical symbol stream X(t) being input to offset block 404. Offset block 404 causes a 2 symbol period delay in the second symbol stream and then the delayed second symbol stream is input to transform block 408. Every two symbols S1 and S2 are processed in transform block 406 using the Alamouti method and the output of the transform is transmitted on antenna 414 and antenna 416. The input signal may be complex valued and of arbitrary constellation size. The Alamouti transformation performed in STS transform block 406 can be written in a matrix form as shown below:

$$\begin{bmatrix} S1W1 & S_2W2 \\ -S_2^*W1 & S_1^*W2 \end{bmatrix} \qquad \text{Equation 12}$$

The rows in the matrix indicate the antenna on which the symbol is transmitted. The symbols S1 and S2 are transmitted simultaneously on antenna 414 during the same two symbol periods in which the symbols—S2* and S1* are transmitted simultaneously on antenna 416.

The second identical symbol stream X(t) input to offset block 404 is delayed by two symbol periods and transformed in transform block 408 using the Alamouti transformation as shown below:

$$\begin{bmatrix} Sd_1W1 & Sd_2W2 \\ -Sd_2^*W1 & Sd_1^*W2 \end{bmatrix} \qquad \text{Equation 13}$$

The rows in the matrix indicate the antenna on which the symbol is transmitted. The symbols Sd1 and Sd2 are transmitted simultaneously on antenna 418 during the same two symbol periods in which the symbols—Sd2* and Sd1* are transmitted simultaneously on antenna 420.

A receiver for the embodiment of the transmitter of FIG. 4 may be implemented in the same manner as the receiver of FIG. 2, with the filter, despread and demodulate block 204 modified to receive the Alamouti coded symbols that are transmitted simultaneously on the Walsh codes W1 and W2.

Various alternative embodiments of the invention are possible. For example, in the case of three transmit antennas, the output of any two of the Alamouti/STS branches can be mapped to the same antenna to obtain a diversity gain of order three. Also, for 6 and 8 antennas the given method can be generalized by using Alamouti transform block combined with 3 and 4 delay diversity branches, respectively.

Figure 5:
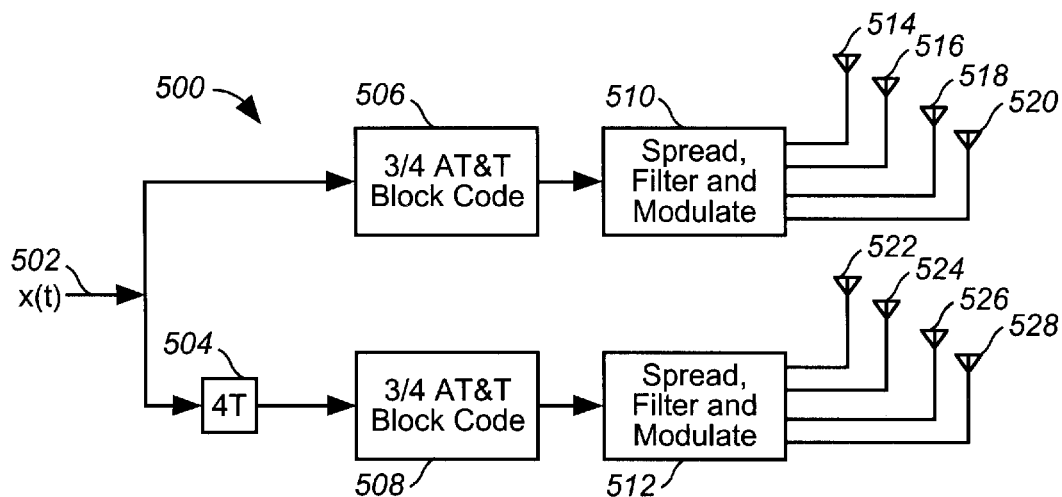
FIG. 5 shows a block diagram of portions of a transmitter according to a further alternative embodiment of the invention.

A further alternative embodiment may also be used for 8 transmit antennas. Referring now to FIG. 5, therein is illustrated a block diagram of portions of a transmitter 500 according to a further alternative embodiment of the invention. Transmitter 500 includes input 502, offset block 504, transform block 506, transform block 508, spread, filter and modulate (SFM) block 510, spread, filter and modulate (SFM) block 512, antenna 514, antenna 516, antenna 518, antenna 520, antenna 522, antenna 524, antenna 526 and antenna 528. Transmitter 500 may be implemented into any type of transmission system that transmits coded or uncoded digital transmissions over a radio interface.

In the embodiment of FIG. 5, transmitter 500 receives an input symbol stream X(t) at input 502. X(t) is split into two identical symbol streams, with one symbol stream X(t) being input to transform block 506, and a second identical symbol stream X(t) being input to offset block 504. Offset block 504 causes a 4 symbol period delay in the second symbol stream and then the delayed second symbol stream is input to transform block 508. Every three symbols S1, S2 and S3 are processed in transform block 506 using a ¾ rate block code transform and the output of transform block 506 is transmitted on antennas 514, 516, 518 and 520. The ¾ rate block code may be as described in the paper by V. Tarokh, H. Jafarkhani, and A. Calderbank, "Space-Time Block Orthogonal Codes from Orthogonal Designs," IEEE Transactions on Information Theory, pp. 1456–1467, July 1999. The delayed second input symbol stream is processed in block 508 using the same ¾ rate block code transform and the output of transform block 508 is transmitted on antennas 522, 524, 526 and 528. The input signal may be complex valued and of arbitrary constellation size.

The ¾ rate ST block code is given by the following transformation.

$$\begin{bmatrix} S_1 & S_2 & S_3 & 0 \\ -S_2^* & S_1^* & 0 & -S_3 \\ -S_3^* & 0 & S_1^* & S_2 \\ 0 & S_3^* & -S_2^* & S_1 \end{bmatrix} \quad \text{Equation 14}$$

The trellis structure for the 8-antenna ST code can be described using the following state labelling.

Next state=input symbols $(S_1, S_2, S_3)$  Equation 15

Output label={previous state, input symbols}={$(S_{d1}, S_{d2}, S_{d3})$, $(S_1, S_2, S_3)$}  Equation 16

A receiver for the embodiment of the transmitter of FIG. 5 may be implemented in the same manner as the receiver of FIG. 2, with the filter, despread and demodulate block 204 modified to receive the ¾ rate block code symbols. It is assumed that the Viterbi decoder has knowledge of the estimated channel coefficients. For the 8-antenna case of FIG. 5, the decoder has to remember all possible 3 previous symbols at each state (i.e., $M^3$ states for M-psk). The branch metrics given for the 4-antenna ST code for FIG.1 may be generalized to the 8-antenna case.

The described and other embodiments could be implemented in systems using any type of multiple access technique, such as time division multiple access (TDMA), code division multiple access (CDMA), frequency division multiple access (FDMA), orthogonal frequency division multiple access (OFDM), or any combination of these, or any other type of access technique. This could also include systems using any type of modulation to encode the digital data.

Thus, although the method and apparatus of the present invention has been illustrated and described with regard to presently preferred embodiments thereof, it will be understood that numerous modifications and substitutions may be made to the embodiments described, and that numerous other embodiments of the invention may be implemented without departing from the spirit and scope of the invention as defined in the following claims.

What is claimed is:

1. A method for transmitting a signal from a plurality of antennas, the signal formed of symbols, sequenced together to form a first input symbol stream, said method comprising the steps of:

receiving the first input symbol stream at a transmitter;

offsetting said first input symbol stream to generate a second input symbol stream, wherein said second input symbol stream is identical to said first input symbol stream but offset from said first input symbol stream M symbol periods;

performing a first transform on at least two symbols of said first input symbol stream over a time period to generate a first transform result;

performing a second transform on at least two symbols of said second input symbol stream, substantially simultaneously over said time period, to generate a second transform result, the second transform identical to the first transform, and transmitting, substantially simultaneously, said first transform result on a first at least one antenna and said second transform result on a second at least one antenna.

2. The method of claim 1, wherein each of said step of performing said first transform and said step of performing said second transform comprises the step of performing an Alamouti transform.

3. The method of claim 2, wherein said step of offsetting comprises offsetting said first input symbol stream to generate said second input symbol stream, wherein said second input symbol stream is identical to said first input symbol stream but offset from said first input symbol stream by two symbol periods, and wherein said step of performing said first transform and said step of performing said second transform each comprises performing said Alamouti transform on two symbols over a time period of two symbol periods.

4. The method of claim 3, wherein said step of transmitting comprises transmitting said first transform result on a first and second antenna and said second transform result on a third and fourth antenna.

5. The method of claim 2, wherein said Alamouti transform is performed in a time domain.

6. The method of claim 5, wherein said step of offsetting comprises delaying said first input symbol stream to generate said second input symbol stream, wherein said second input symbol stream is offset from said first input symbol stream by two symbol periods, and wherein said step of performing said first transform and said step of performing said second transform each comprises performing said Alamouti transform on two symbols over a first time period of said two symbol periods, and said step of transmitting comprises transmitting said first transform result on a first and second antenna and said second transform result on a third and fourth antenna over a second time period of said two symbols, wherein consecutive first and second transform symbols are transmitted from each antenna during a first and second portion, respectively, of said second time period of said two symbols.

7. The method of claim 2, wherein said Alamouti transform is performed in a Walsh code domain.

8. The method of claim 7, wherein said step of offsetting comprises delaying said first input symbol stream to generate said second input symbol stream, wherein said second input symbol stream is offset from said first input symbol stream by two symbol periods, and wherein said step of performing said first transform and said step of performing said second transform each comprises performing said Alamouti transform on two symbols over a first time period of two symbol periods, and said step of transmitting comprises transmitting said first transform result on a first and second antenna and said second transform result on a third and fourth antenna over a second time period of said two symbols, wherein first and second transform symbols are simultaneously transmitted from each antenna over said second time period of two symbols.

9. The method of claim 1, wherein said step of performing said first transform and said step of performing said second transform each comprises the step of performing a ¾ block code transform.

10. The method of claim 9, wherein said step of offsetting comprises delaying said first input symbol stream to generate said second input symbol stream, wherein said second input symbol stream is offset from said first input symbol stream by four symbol periods, and wherein said step of performing said first transform and said step of performing said second transform each comprises performing said ¾ block code transform on three symbols over a time period of said four symbol periods.

11. The method of claim 10, wherein said step of transmitting comprises transmitting said first transform result on a first, second, third and fourth antenna and said second transform result on a fifth, sixth, seventh and eighth antenna.

12. The method of claim 11, wherein said step of offsetting comprises delaying said first input symbol stream to generate said second input symbol stream, wherein said second input symbol stream is offset from said first input symbol stream by four symbol periods, and wherein said step of performing said first transform and said step of performing said second transform each comprises performing said ¾ block code transform on three symbols over a first time period of said four symbol periods, and said step of transmitting comprises transmitting said first transform result on a first, second, third and fourth antenna and said second transform result on said fifth, sixth, seventh and eighth antenna over a second time period of four symbols, wherein consecutive first, second, third and fourth transform symbols are transmitted from each antenna during a first, second, third and fourth period, respectively, in said second time period of four symbols.

13. An apparatus for transmitting a signal from a plurality of antennas, the signal formed of symbols sequenced together to form a first input symbol stream, said apparatus comprising:

offset means for offsetting the first input symbol stream to generate a second input symbol stream, wherein said second input symbol stream is identical to said first input symbol stream but offset from said first input symbol stream by M symbol periods;

first transform means for performing a first transform on at least two symbols of said first input symbol stream over a time period to generate a first transform result;

second transform means for performing a second transform on at least two symbols of said second input symbol stream, substantially simultaneously over said time period, to generate a second transform result, the second transform identical to the first transform;

a first at least one antenna and a second at least one antenna; and transmitter means for transmitting, substantially simultaneously, said first transform result on said first at least one antenna and said second transform result on said second at least one antenna.

14. The apparatus of claim 13, wherein said first transform means for performing said first transform and said second transform means for performing said second transform each comprises means for performing an Alamouti transform.

15. The apparatus of claim 14, wherein said offset means comprises means for offsetting said first input symbol stream to generate said second input symbol stream, wherein said second input symbol stream lags said first input symbol stream by two symbol periods, and wherein said first transform means and said second transform means each comprises means for performing said Alamouti transform on two symbols over a time period of said two symbol periods.

16. The apparatus of claim 15, wherein said transmitter means comprises means for transmitting said first transform result on a first and second antenna and said second transform result on a third and fourth antenna.

17. The apparatus of claim 16, wherein said first transform means and said second transform means perform said Alamouti transform in a time domain.

18. The apparatus of claim 17, wherein said offset means comprises means for offsetting said first input symbol stream to generate said second input symbol stream, wherein said second input symbol stream is offset from said first input symbol stream by said two symbol periods, and wherein said first transform means and said second transform means each comprises means for performing said Alamouti transform on two symbols over a first time period of said two symbol periods, and said transmitter means comprises means for transmitting said first transform result on said first and second antenna and said second transform result on said third and fourth antenna over a second time period of said two symbols, wherein consecutive first and second transform symbols are transmitted from each antenna during a first and second portion, respectively, of said second time period of said two symbols.

19. The apparatus of claim 18, wherein said first transform means and said second transform means perform said Alamouti transform in a Walsh code domain.

20. The apparatus of claim 19, wherein said offset means comprises means for delaying said first input symbol stream to generate said second input symbol stream, wherein said second input symbol stream is offset from said first input symbol stream by said two symbol periods, and wherein said first transform means and said second transform means each comprises means for performing said Alamouti transform on said two symbols over said time period of said two symbol periods, and said transmitter means comprises means for transmitting said first transform result on said first and second antenna and said second transform result on said third and fourth antenna over a second time period of two symbols, wherein first and second transform symbols are simultaneously transmitted from each antenna over said second time period of two symbols.

21. The apparatus of claim 20, wherein said first transform means for performing said first transform and said second transform means for performing said second transform each comprises means for performing a ¾ block code transform.

22. The apparatus of claim 21, wherein said offset means comprises means for offsetting said first input symbol stream to generate said second input symbol stream, wherein said second input symbol stream is offset from said first input symbol stream by four symbol periods, and wherein said first transform means and said second transform means each comprises means for performing said ¾ block code transform on three symbols over a time period of said four symbol periods.

23. The apparatus of claim 22, Wherein said first at least one antenna comprises a first, second, third and fourth antenna, and said second at least one antenna comprises a fifth, sixth, seventh and eighth antenna.

24. The apparatus of claim 23, wherein said offset means comprises means for offsetting said first input symbol stream to generate said second input symbol stream, wherein said second input symbol stream is offset from said first input symbol stream by said four symbol periods, and wherein said first transform means and said second transform means each comprises means for performing said ¾ block code transform on said three symbols over a first time period of said four symbol periods, and said transmitter means comprises means for transmitting said first transform result on said first, second, third and fourth antenna and said second transform result on said fifth, sixth, seventh and eighth antenna over a second time period of four symbols, wherein consecutive first, second, third and fourth transform symbols are transmitted from each antenna during a first, second, third and fourth period, respectively, of said second time period of said four symbols.

* * * * *